June 23, 1931. N. L. DORN ET AL 1,810,948
COLLAR, TUBING, AND CASING PROTECTOR
Filed May 13, 1930
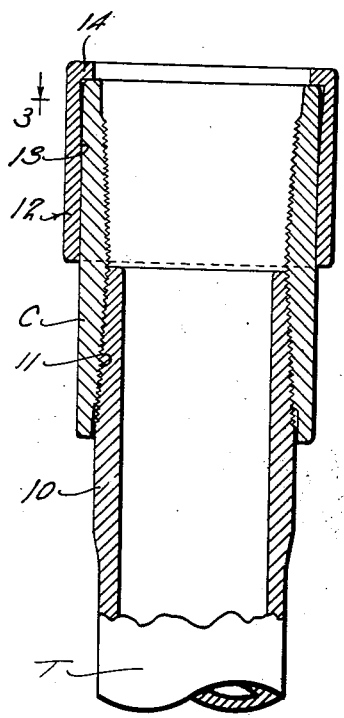
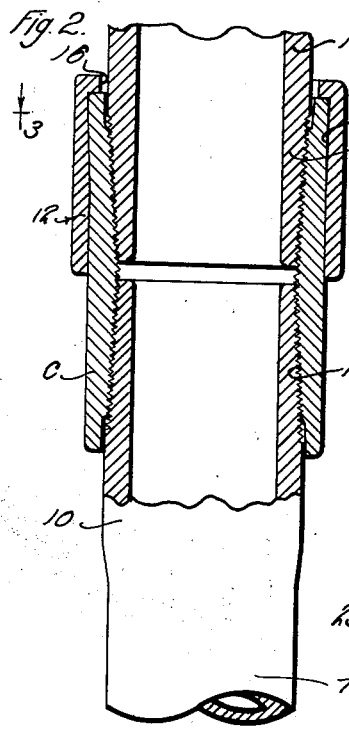
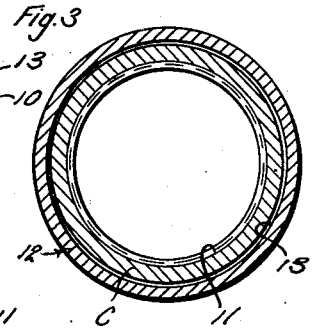
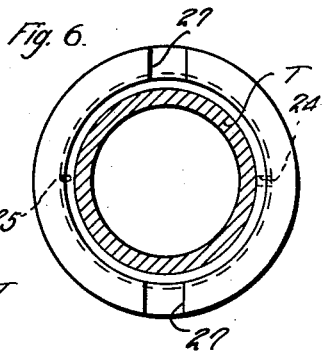
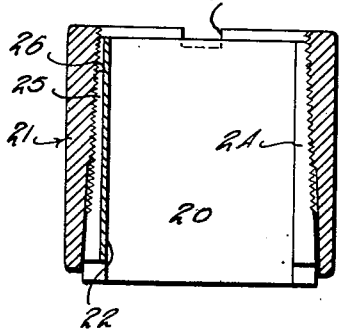
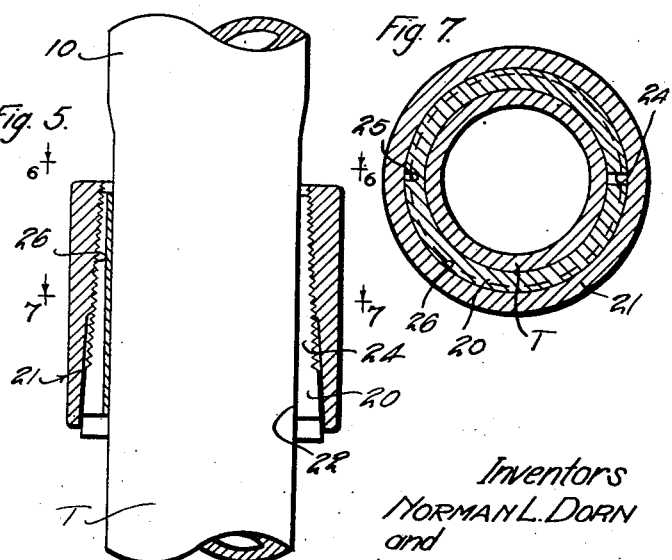
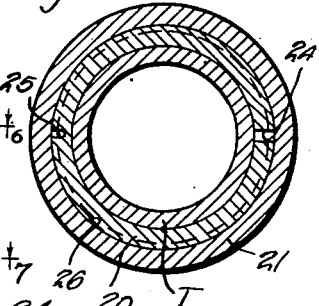
Inventors
NORMAN L. DORN
and
WILLIAM A. CLARK
By
Their Attorney Patented June 23, 1931

1,810,948

UNITED STATES PATENT OFFICE

NORMAN L. DORN AND WILLIAM A. CLARK, OF LONG BEACH, CALIFORNIA

COLLAR, TUBING, AND CASING PROTECTOR

Application filed May 13, 1930. Serial No. 452,019.

This invention relates to a bearing and protective device and relates more particularly to a bearing and protector for use on well drilling and well pumping equipment. During the pumping of fluid from deep wells, for example, oil wells, the oil tubing, or tubing through which the fluid is passed to the surface, is stretched or elongated and permitted to return to its normal size upon each stroke of the pump plunger at the lower end of the tubing. This elongation and contraction of the oil tubing is caused partially by the weight of the column of fluid or oil being intermittently applied to the plunger of the pump and the tubing. The well casing surrounding the tubing is sometimes crooked or collapsed at various points and movement of the oil tubing during pumping operations causes the oil tubing and the collars or couplings connecting the lengths of tubing to rub against and wear the casing at the points where it is crooked or collapsed. The device provided by this invention is particularly suited for use on oil tubing to prevent excessive wearing of the tubing and well casing, and throughout the following disclosure the device will be described as employed on oil tubing for this purpose. It is to be understood, however, that the invention is not to be taken as limited to this particular application, as the device is suited for use on drill pipe, sucker rods, and various other parts reciprocating or moving within tubular members.

It is a general object of the invention to provide a simple, practical, and effective bearing device or protector for use on oil tubing to prevent excessive wearing of the tubing and the well casing surrounding the tubing.

It is an object of the invention to provide a tubing and casing protector of the character mentioned that may be formed of bronze or a suitably alloy of soft metals and that may be securely mounted on a tubing collar without welding and without being shrunk onto the collar.

It is another object of the invention to provide a tubing and casing protector that is adapted to be securely mounted on a common tubing collar or coupling which connects two lengths of tubing without being threaded on the collar or coupling. The protector provided by the present invention is adapted to be tightly and securely mounted on a tubing collar, or the like, without cutting threads in the collar and without welding it to the collar so that the collar is not in any way weakened.

It is a further object of the invention to provide a casing protector of the character mentioned that is easily mounted on a collar and which does not encase the entire collas so that the collar may be gripped by tongs for making or breaking the connection between the sections of tubing.

Other objects and features of our invention will be best and more fully understood from the following detailed description of typical preferred forms and applications of the invention, throughout which description reference is had to the accompanying drawings, in which:

Fig. 1 is a longitudinal detailed sectional view of a tubing collar mounted on the upper end of a length of tubing illustrating a simple form of the invention on the collar before the other length of tubing has been threaded into the collar. Fig. 2 is a view similar to Fig. 1 illustrating the collar connecting the two sections or lengths of tubing and showing the protector in operating position on the collar. Fig. 3 is a transverse detailed sectional view taken as indicated by line 3—3 on Fig. 1. Fig. 4 is a longitudinal detailed sectional view of another form of the invention. Fig. 5 is a longitudinal detailed sectional view of the form of the invention illustrated in Fig. 4 illustrating it in position on a section of tubing, and Figs. 6 and 7 are transverse detailed sectional views taken as indicated by line 6—6 and 7—7, respectively, on Fig. 5.

In Figs. 1, 2, and 3 of the drawings we have illustrated an embodiment of the invention for application to a common tubing collar C, while in Figs. 4 to 7, inclusive, of the drawings we have illustrated a form of the invention suited for mounting directly on a length or section T of tubing.

The tubing T illustrated in the drawings is typical oil tubing for passing oil to the surface of a well and is provided at its ends with externally upset or enlarged portions 10 for connection with the collars C. The upset or enlarged portions 10 are provided with tapered screw-threaded end parts for threading into the collar C. The collar C illustrated in the drawings is a common or typical tubing collar for connecting or joining lengths of oil tubing. The collar C in accordance with the standard practice is provided with a smooth cylindrical exterior. The interior of the collar C is formed to receive the tapered enlarged portions 10 of two lengths of tubing T; having the lower portion of its opening 11 screw-threaded and tapered downwardly and outwardly and having the upper portion of its opening 11 screw-threaded and tapered upwardly and outwardly.

The protector provided by the present invention intended for use on the collar C is a simple cylindrical member or body 12 adapted to encase or surround a portion of the collar C. The protector 12 is preferably formed of bronze or a suitable alloy of soft metals so that its frictional engagement with the well casing will not cause appreciable wear to the casing. The protector or body 12 is preferably formed with a smooth cylindric exterior. In accordance with the preferred form of the invention, the body 12 is shorter than the collar C and in the particular form of the invention illustrated in the drawings, the body 12 is approximately one-half the length of the collar C. The protector body 12 is adapted to be forced longitudinally on the collar and its opening 13 is smooth and adapted to tightly receive the collar C. As initially formed, the opening 13 is of slightly less diameter than the exterior of the collar C so that when the protector is forced over the end of the collar it tightly seats on or grips the collar.

An inwardly projecting flange 14 is provided at one end of the body 12 to engage an end of the collar C. The flange 14 is provided to engage over the end of the collar C to prevent engagement of the end of the collar with the well casing and to limit the movement of the protector on the collar when the protector is being mounted or assembled on the collar. In the preferred form of the invention the opening 13 of the protector is tapered outwardly and upwardly to the radial flange 14. The opening 13 may be tapered throughout its length so that only the inner portion of the body 12 grips the collar when it is forced into position on the collar or only the outer or upper portion of the opening 13 may be tapered as illustrated in the drawings. The tapered portion of the opening 13 provides a space which permits the expansion of the end portion of the collar C when the second or upper length of tubing 15 is threaded into the collar. When the connection or joint is made up, that is, when the upper length of tubing 15 is threaded into the collar C, the cooperation between the tapered walls of the collar opening 11 and the tapered upset portion 10 of the tubing 15 causes the upper end portion of the collar C to be expanded outwardly to occupy the space provided by the tapered opening 13 and to tightly engage or seat against the walls of the opening 13. In practice the threading of the upper length of tubing 15 into the collar C expands the collar into tight gripping engagement with the interior of the protector body 12 so that the protector is effectively held against longitudinal and rotational movement on the collar. It will be obvious that the flange 14 engages the end of the collar C to prevent shifting of the protector in the one direction on the collar while the portion of the collar expanded into the tapered end of the opening 13 prevents shifting of the protector in the opposite direction. The flange 14 is proportioned so that there is an annular space 16 between the inner edge of the flange 14 and the upset portion 10 of the tubing 15 adapted to hold oil or fluid which acts as a lubricant for the protector to reduce the wearing of the protector and the well casing.

The form of the invention illustrated in Figs. 4 to 7, inclusive, is intended primarily to be mounted on the intermediate portion or body of a tubing T and is suited for use on an oil tubing, or the like, where the wear or engagement between the tubing and the well casing occurs at points between the tubing collars C. This form of the invention includes, generally, a tubing gripping member 20 and the protector proper 21.

The gripping member 20 is a cylindrical or tubular part intended to be arranged around the tubing T. The member 20 is formed of a yieldable or flexible metal and the opening 22 of the member 20 is normally of slightly less diameter than the external diameter of the tubing T. The member 20 is adapted to be sprung and slid over the enlarged upset end portion 10 of the tubing T to be arranged in the desired position between the upset portions at the opposite ends of the tubing. A longitudinal split or opening 24 is provided in the member 20 and extends longitudinally of the member from one end to the other. A longitudinal recess or groove 25 is provided on the exterior of the member 20 diametrically opposite the split 24. The groove 25 is provided to render the member 20 particularly yielding or flexible so that it may be readily sprung over the enlargement 10 without danger of breaking. The exterior of the member 20 is longitudinally tapered and may be tapered throughout the entire length of the member. The exterior of the member 20 is screw-threaded to cooperate with threads on the interior of the protector 21.

The protector 21 is an integral tubular part and is preferably formed of bronze or an alloy of soft metals. The protector 21 is preferably of substantially the same length as the gripping member 20 and its exterior may be smooth and cylindric as illustrated in the drawings. The opening 26 of the protector 21 is longitudinally tapered and screw-threaded to cooperate with the tapered screw-threaded exterior of the gripping member 20. The opening 26 at its smallest point is slightly greater in diameter than the upset portion 10 of the tubing so that the protector 21 may be readily slid over the end of the tubing onto the member 20. The protector 21 is adapted to be threaded onto the gripping member 20 to encase the member 20 and cause the member to be contracted onto the tubing T. The protector 21 may be provided at its edge with notches 27 adapted to receive a suitable wrench or tool for handling the protector. The split 24 in the gripping member 20 is sufficiently wide to permit the member 20 to be contracted or reduced in diameter by the threading of the protector 21 onto the member 20 so that it effectively grips the tubing T. It will be apparent that when the protector 21 is threaded onto the gripping member 20 that the tapered opening 26 will cooperate with the tapered exterior of the member 20 to tightly compress the member 20 onto the tubing T.

It is believed that the utility and practicability of the forms of the invention described above will be readily apparent from the foregoing detailed description. The type of protector 12 illustrated in Figs. 1, 2, and 3 of the drawings may be mounted on the collars C of an oil tubing at spaced intervals as desired or necessary to prevent excessive wearing at crooked or collapsed points along the well casing. In the event that the oil tubing engages and wears the well casing at points between the collars C, protectors of the type illustrated in Figs. 4 to 7, inclusive, of the drawings may be arranged on the tubing T in the proper positions to prevent excessive wearing of the casing.

It is to be noted that the invention provides a casing protector that may be easily and quickly mounted on a tubing collar, or the like, without the necessity of cutting threads or without welding. The expansion of the collar C into the tapered opening of the protector positively prevents displacement of the protector from the collar. The protector is extremely simple and inexpensive of manufacture and may be applied to a collar without the use of special tools or equipment.

Having described only typical preferred forms of our invention, we do not wish to limit ourselves to the specific details set forth, but wish to reserve to ourselves any changes or variations that may appear to those skilled in the art or fall within the scope of the following claims:

Having described our invention, we claim:

1. A casing protector of the character described including, a tubular body having a tapered opening adapted to receive a cylindrical tubing collar, and an inwardly projecting flange at the largest end of the opening for engaging an end of the collar.

2. A casing protector of the character described including, a tubular body having a smooth tapered opening adapted to receive a tubing collar, and an inwardly projecting flange at the largest end of the opening for engaging an end of the collar.

3. A casing protector of the character described including, a body of soft metal having a smooth tapered opening adapted to receive a tubing collar, and an inwardly projecting flange at the largest end of said opening adapted to engage an end of the collar.

4. In combination, a length of tubing having a tapered screw-threaded portion, a collar having a tapered screw-threaded opening receiving the said portion of tubing, and a protector having a smooth tapered opening tightly receiving the end portion of the collar which has been expanded by cooperation between the threaded portion of the tubing and the tapered threaded opening in the collar, and an inwardly projecting flange at the largest end of the protector opening engaging an end of the collar.

5. A casing protector for use on a tubing collar having a tapered screw-threaded opening which includes a body having a tapered opening receiving the collar, the walls of the tapered opening being adapted to be tightly engaged by the collar upon a tubing being threaded into the collar causing the collar to expand.

6. A casing protector for use on a cylindrical tubing collar having a tapered screw-threaded opening which includes a body with a longitudinally tapered opening having a portion to tightly receive the collar and a larger portion to be tightly engaged by the collar upon a tubing being threaded into the tapered opening of the collar causing the collar to expand.

7. A casing protector for use on a cylindrical tubing collar having a tapered screw-threaded opening which includes a body with a longitudinally tapered opening having a portion to tightly receive the collar and a larger portion to be tightly engaged by the collar upon a tubing being threaded into the tapered opening of the collar causing the collar to expand, and an inwardly projecting flange at the largest end of the body opening for engaging an end of the collar.

In witness that we claim the foregoing we have hereunto subscribed our names this 6th day of May, 1930.

NORMAN L. DORN.
WILLIAM A. CLARK.